United States Patent [19]

Robinson

[11] 4,246,022

[45] Jan. 20, 1981

[54] PROCESSING METAL CHLORIDES

[75] Inventor: Michael Robinson, Wooton, England

[73] Assignee: Laporte Industries Limited, London, England

[21] Appl. No.: 30,112

[22] Filed: Apr. 16, 1979

[30] Foreign Application Priority Data

May 5, 1978 [GB] United Kingdom ............... 17932/78

[51] Int. Cl.$^3$ ............................................. C22B 55/00
[52] U.S. Cl. ........................................ 75/11; 75/1 T; 75/10 R; 75/84
[58] Field of Search ............... 75/21, 1 T, 29, 84, 75/10 R, 11, 84.5

[56] References Cited

U.S. PATENT DOCUMENTS

| | | | |
|---|---|---|---|
| 3,859,077 | 1/1975 | Othmer | 75/1 T |
| 3,989,510 | 11/1976 | Othmer | 75/21 |

*Primary Examiner*—M. J. Andrews

*Attorney, Agent, or Firm*—Kane, Dalsimer, Kane, Sullivan and Kurucz

[57] ABSTRACT

Metal may be recovered from metal chlorides, for example a mixed metal chloride residue from the fluidized bed chlorination of a titaniferous ore in the presence of carbon to produce titanium tetrachloride by heating, in the presence of a scavenging agent, which may comprise a combination of titanium dioxide and carbon inherently present in a residue from the aforesaid fluidized bed chlorination process, to at least 1500° C. and preferably to a temperature at which iron present is liquid. If the temperature is maintained at below 2200° C. iron, vanadium and niobium may be recovered preferentially to certain lower value metals which remain in the form of chlorides giving the possibility for the recovery of a high value mixed metal product. Titanium trichloride may be formed and this may be chlorinated to titanium tetrachloride thereby increasing the efficiency of the original chlorination process.

9 Claims, No Drawings

PROCESSING METAL CHLORIDES

BACKGROUND OF THE INVENTION

1. Field of the Invention

This invention relates to the processing of metal chlorides and the recovery, therefrom, of metal.

2. Brief Description of the Prior Art

Titanium tetrachloride may be produced by chlorinating a titaniferous material which, typically, contains at least 90% by weight of titanium dioxide either because it comprises a titanium-rich ore such as rutile or because it comprises an ore beneficiate or synthetic rutile from which a large proportion of the iron originally in the ore has been removed. The chlorination is followed by the purification of the titanium tetrachloride vapour produced and the accumulation in the course of such purification of one or more residues which, typically, contain iron compounds but which may also contain chlorides of high value metals, such as niobium or vanadium and chlorides of relatively low value metals such as aluminium, magnesium, calcium and manganese.

Particularly, in the chlorination of a titaniferous ore such as rutile or synthetic rutile ore, in a fluidised bed in the presence of carbon the stream of gases issuing from the fluidised bed contains 1. Blow-over dust, e.g. $TiO_2$, C, $SiO_2$, $ZrO_2$, $ZrSiO_4$.
2. Vapourous chlorides of the minor constituents of the ore.
3. Residual inert gas and carbon oxides.
4. Titanium tetrachloride vapour.

This effluent stream may be cooled to condense some of the chlorides, notably iron chlorides and niobium chloride, without condensing any substantial quantity of titanium tetrachloride and passed to a cold cyclone where such condensed materials and blow-over dust are substantially removed from the stream. The titanium tetrachloride may then be condensed to separate it from residual inert gases and carbon oxides and purified by treatment with mineral oil, a mineral oil sludge residue often containing aluminium chloride, niobium chloride and vanadium chloride thereby being produced.

It would be desirable to recover the high value metals from metal chloride residues. Particularly, the cyclone and oil purification residues from titanium tetrachloride production, combined or separately, provide a relatively concentrated source of high value metals, e.g. niobium and/or vanadium, if they can be recovered effectively and economically from the chloride form in which they are present in the residues and, preferably, fractionated to some extent from the low value metals also present. A typical combined cyclone and oil purification residue from a titaniferous ore chlorination process for the production of titanium tetrachloride can contain, for each mole of titanium tetrachloride produced, up to about 0.0075 moles of vanadium chloride and up to about 0.005 moles of niobium chloride and, assuming the producing unit to be on a commercial scale, the equivalent annual quantities of vanadium metal and niobium metal present in the residue amount of hundreds of tons.

British Pat. No. 1,250,913 relates to a process for treating a vanadium, zirconium or chromium-containing residue from the chlorination of titaniferous ore, to facilitate the recovery of vanadium therefrom, comprising treating the residue with water in an amount insufficient to slurry the residue but at least sufficient theoretically to react with all the chlorine of the residue and heating the so-treated residue in a free oxygen-containing atmosphere at a temperature of at least 300° C. to remove the major part of the chlorine as hydrogen chloride to ease the recovery of vanadium, zirconium or chromium as oxides. The said recovery is a chemical process involving treatment with an alkali or acid to provide solutious which, by conventional techniques, give rise to the separate constituent metals.

The U.S. Bureau of Mines Report R1 7671 (1972) describes a process for the separation of columbium (niobium), tantalum, titanium, and zirconium from mineral waste from the chlorination of rutile ore. The process described is a liquid-liquid extraction process involving the use of a 10-stage reactor.

SUMMARY OF THE INVENTION

The present invention relates to a process for the direct recovery of metals from metal chlorides. The invention is particularly applicable to the treatment of residues from the production of titanium tetrachloride by the chlorination of a titaniferous material. The invention is also applicable to other metal chloride residues, from whatever source, subject to the presence of a sufficiently high proportion of compounds of high value metals to render the use of the invention economic.

DETAILED DESCRIPTION OF THE PREFERRED EMBODIMENTS OF THE INVENTION

The present invention provides a process for the treatment of metal chloride to recover metal therefrom characterised by establishing a mixture of metal chloride and a chlorine scavenger, causing the metal chloride to react with the chlorine scavenger by heating them to a temperature of at least 1500° C. and separating the resulting metal from the resulting chlorine-loaded scavenger.

One class of chlorine scavenger which is suitable for use in the practice of this invention comprises a combination of a metal oxide capable of forming metal chlorides volatile at the temperature involved and a de-oxidant.

Preferably the metal oxide is titanium dioxide, although alumina or silicon dioxide may, alternatively, be usable. Preferably the metal oxide has a particle size no greater than 500 and, particularly preferably, no greater than 175 microns. Preferably the de-oxidant is a form of carbon, for example, coke. Preferably the de-oxidant has a particle size of no greater than 3500 microns and particularly preferably, no greater than 500 microns. In use, the metal oxide forms volatile metal chloride, for example titanium chloride, the de-oxidant may combine with the oxygen released to form carbon oxides and the metal of the original metal chloride may remain in the metallic state for recovery. The metal oxide and the carbon are preferably used in at least the theoretical quantity to fulfil their purpose, that is, to react with the quantity of metal chloride reactive at the temperature employed which is present and, particularly preferably, are used in an excess over that quantity, for example, an excess of from 50% to 250%.

It is a particularly advantageous feature of this invention that metal chloride residues recovered from effluent gases from the fluidised bed chlorination of a titaniferous ore carried out in the presence of carbon may be treated directly, by applying the required temperature thereto, since they inherently contain a chlorine scavenger by reason of their content of titanium dioxide and of carbon in the form of blow-over dust for the operation of the invention. Generally the chlorine scavenger is present in a suitable quantity.

Preferably the mixture of metal chloride and chlorine scavenger is heated to a temperature such that at least the iron component of the product metals is in the liquid form. Since the iron component is a product component this may enable the product mixed metals, even if some are at temperatures below their individual melting points, to be tapped or poured from the product receiving vessel and, if desired, directly cast into ingots. Certain metals, notably iron, tend to volatalise at about 3000° C. and the mixture of metal chloride and chlorine scavenger is therefore heated to as a preference below such temperature.

We have found that a certain degree of separation of more valuable from less valuable metals is possible by further particular control of the temperature within the broad indication given above. If the mixture of metal chloride and chlorine scavenger is heated to below about 2200° C. at least a proportion of chlorides of the less valuable metals, for example some or more of aluminium, zirconium, maganese, magnesium and calcium, fails to react with the chlorine scavenger with the effect that said proportion, which is volatalised, may be led off as vapour. To attain efficient operation of the invention the mixture of metal chloride and chlorine scavenger is preferably heated to at least 1700° C. at which temperature the metals product is more readily recovered than at lower temperatures.

The metal product of this invention may mainly comprise a mixture of iron together with vanadium and/or niobium. Where an ore containing little iron has been chlorinated to produce titanium tetrachloride, for example rutile ore, the metal product obtained by the practice of this invention may comprise not more than 50% for example from 20% to 50%, by weight of iron. The metal product of the invention may contain up to about 25% for example from 10% to 25% by weight of vanadium and/or niobium.

Where the invention is operated using a chlorine scavenger including titanium dioxide the titanium chloride produced mainly comprises titanium trichloride although at higher temperatures titanium dichloride may be formed. Titanium trichloride is a desirable byproduct since it is readily recovered from inert gases and carbon oxides by condensation. It may be readily chlorinated to titanium tetrachloride. The quantity of extra titanium tetrachloride which may be generated in this manner may be over 0.05 moles per mole of titanium tetrachloride produced by ore chlorination and therefore represents an appreciable increase in the efficiency of the titanium tetrachloride production process from which the residues treated by the invention were derived.

The further chlorination of the lower chloride is exothermic and is readily accomplished merely by contact, in the vapour phase with chlorine gas. Preferably the chlorination is conducted by directly contacting the gaseous stream containing the lower chlorides with chlorine. Preferably the further chlorination is conducted at a temperature of at least 1000° C. but below 2200° and, particularly preferably below 1500° C.

The present invention may be carried out in any of a variety of electrical discharge furnaces capable of imparting temperatures in excess of 1500° C. to a particulate solid feed. Alternatively, the process may be conducted in an electrical induction furnace which has the advantage of not being subject to interference with a discharge by particles being treated, or products of that treatment, for example iron in liquid form, some of which may be electrically conductive. Suitably the process is conducted by allowing a mixture of metal chloride and chlorine scavenger to fall through a reaction chamber capable of imparting the requisite temperature to the falling stream.

The practice of the present invention may give rise to the formation of phosgene. Normal precautions applicable to gases containing phosgene should therefore be applied.

An Example of the practice of this invention will now be described.

EXAMPLE

Titanium tetrachloride was produced by the chlorination of particles of rutile ore in admixture with particles of carbon in a fluidised bed. The hot titanium tetrachloride-containing gas stream issuing from the bed was passed into a cyclone maintained at 200° C. which acted to condense certain metal chlorides from the gas stream and to recover these together with carbon dust to form a residue. The titanium tetrachloride was condensed separately and purified by treating it with an oil to produce a further residue. The residues thereby obtained were mixed and the mixed residue contained.

23% titanium oxide
44% carbon
1.1% silicoh oxide
4.5% zirconium oxide
8.2% iron chloride
2.5% chromium chloride
5.9% vanadium chloride
5.5% aluminium chloride
5.3% niobium chloride A charge of 125 g of the mixed residue was placed in the crucible of a Raydyne 10 kilowatt induction heater model C95. The crucible was of graphite, was cylindrical, with one closed end and the dimensions length 18 cm, external diameter 8 cm and internal diameter 3 cm, and was positioned horizontally supported on an axial rotatable graphite rod protruding from the closed end. At the other end to the rod the crucible was fitted with a graphite screw plug to seal in the charge and to prevent the volatile metal chlorides venting to the atmosphere. A 7 mm diameter hole was drilled in the body of the crucible to come within 2 mm of the inner surface and to accommodate a withdrawable iridium/iridium 40% rhodium thermocouple. The crucible was surrounded by the induction coil with a space therebetween thermally insulated with ceramic wool, and the coil/crucible assembly was contained in an asbestos box.

The crucible, containing the charge, was rotated at 25 rpm and electrical power was applied to the coil. Periodically, the power was switched off, the rotation stopped and a temperature measurement made with the withdrawable thermocouple. A temperature of 1700° C. was achieved and maintained for 30 minutes. Power was switched off and the system allowed to cool.

When the crucible was cool. The screw plug was removed and there was a release of pressure. There were a few crystals of a purple compound, which on analysis was shown to be $TiCl_3$, and a slag like material was also found. When the slag was broken up some beads of metal were found which weighed 3.0 grams. This metal was analysed by X-ray fluorescence aud found to have almost equal atomicities of vanadium and niobium with double the atomicity of iron.

I claim:

1. A process for treating a mixture of metal chlorides comprising iron chloride and a compound selected from the group consisting of vanadium chloride, niobium chloride and mixtures thereof to recover the corresponding metals therefrom, which comprises;

establishing a mixture of the metal chlorides and a chlorine scavenger which comprises a combination of carbon and a metal oxide capable of forming a corresponding volatile metal chloride at the temperature to which the mixture of metal chlorides and the chlorine scavenger are heated as hereinafter described;

causing the metal chlorides to react with the chlorine scavenger by heating their mixture to a temperature of at least 1,500°. C.; and separating said corresponding metals from the resulting chlorine-loaded scavenger.

2. A process as claimed in claim 1 conducted in an electrical discharge furnace.

3. A process as claimed in claim 1 conducted in an electrical induction furnace.

4. A process as claimed in claim 1 wherein the metal oxide is selected from titanium dioxide, silicon dioxide and alumina.

5. A process as claimed in claim 1 wherein the carbon is in the form of particles having a size no greater than 3500 microns and the metal oxide is in the form of particles having a size no greater than 500 microns.

6. A process as claimed in claim 1 wherein the carbon and the metal oxide are present in an excess over the quantity required in theory having regard to the quantity of metal chloride reactive with the chlorine scavenger at the temperature employed.

7. A process as claimed in claim 1 wherein metal chloride to be treated comprises a residue recovered from effluent gases from the fluidised bed chlorination of an iron-containing titaniferous ore carried out in the presence of carbon, the residue containing a chlorine scavenger by reason of its content of titanium dioxide and of carbon.

8. A process as claimed in claim 1 wherein the metal chloride to be treated and the chlorine scavenger are heated to a temperature such that iron present would be in the liquid form.

9. A process as claimed in claim 1 wherein the metal chlorides to be treated further comprises, at least one chloride of aluminium, zirconium, manganese, magnesium and calcium the metal chloride to be treated and the scavenger being heated to a temperature below 2200° C.

* * * * *

UNITED STATES PATENT AND TRADEMARK OFFICE
CERTIFICATE OF CORRECTION

PATENT NO. : 4,246,022
DATED : January 20, 1981
INVENTOR(S) : Michael Robinson

It is certified that error appears in the above—identified patent and that said Letters Patent is hereby corrected as shown below:

Column 4, line 42; "grapite" should read -- graphite -- .

Column 6, Claim 9; Delete Claim 9 in its entirety.

Signed and Sealed this

Fourteenth Day of April 1981

[SEAL]

Attest:

RENE D. TEGTMEYER

Attesting Officer

Acting Commissioner of Patents and Trademarks